(12) United States Patent
Ferreira Moreno et al.

(10) Patent No.: US 12,260,345 B2
(45) Date of Patent: Mar. 25, 2025

(54) MULTIMODAL KNOWLEDGE CONSUMPTION ADAPTATION THROUGH HYBRID KNOWLEDGE REPRESENTATION

(71) Applicant: International Business Machines Corporation, Armonk, NY (US)

(72) Inventors: Marcio Ferreira Moreno, Rio de Janeiro (BR); Rafael Rossi de Mello Brandao, Rio de Janeiro (BR); Renato Fontoura de Gusmão Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 16/666,747

(22) Filed: Oct. 29, 2019

(65) Prior Publication Data

US 2021/0125086 A1    Apr. 29, 2021

(51) Int. Cl.
| | | |
|---|---|---|
| G09B 7/02 | (2006.01) | |
| G06F 3/048 | (2013.01) | |
| G06F 8/30 | (2018.01) | |
| G06F 16/903 | (2019.01) | |
| G06F 16/9035 | (2019.01) | |
| G06F 16/93 | (2019.01) | |
| G06N 3/082 | (2023.01) | |

(Continued)

(52) U.S. Cl.
CPC ............. *G06N 5/04* (2013.01); *G06F 16/903* (2019.01); *G06F 16/90335* (2019.01); *G06F 16/9035* (2019.01); *G06N 3/082* (2013.01); *G06N 5/02* (2013.01)

(58) Field of Classification Search
CPC ............ G06N 5/04; G06N 3/082; G06N 5/02; G06N 5/045; G06N 5/022; G06F 16/903; G06F 16/90335; G06F 16/9035
See application file for complete search history.

(56) References Cited

U.S. PATENT DOCUMENTS

| | | | |
|---|---|---|---|
| 6,064,971 A | 5/2000 | Hartnett | |
| 7,043,474 B2 | 5/2006 | Mojsilovic et al. | |
| 7,853,864 B2 | 12/2010 | Ro et al. | |

(Continued)

FOREIGN PATENT DOCUMENTS

| | | |
|---|---|---|
| CN | 107403236 A | 11/2017 |
| WO | 2002073331 A2 | 9/2002 |

OTHER PUBLICATIONS

Grumberg, et al., Learning to Order BDD Variables in Verification, Journal of Artificial Intelligence Research 18, 2003, pp. 83-116 (Year: 2003).*

(Continued)

*Primary Examiner* — Brandon S Cole
(74) *Attorney, Agent, or Firm* — Patterson + Sheridan, LLP

(57) ABSTRACT

A system and a method of generating and using a multimodal knowledge representation within an artificial intelligence computing system may include prompting a selection of nodes in a graphical visualization; defining an adaptation strategy based; integrating an adaptation strategy representation with the selection of nodes to generate a multimodal knowledge representation; traversing the selection of nodes in response to a user query; performing an adaptation on the (Continued)

selection of nodes; and updating the knowledge representation based on user feedback to a result generated in response to the user query.

20 Claims, 6 Drawing Sheets

(51) Int. Cl.
*G06N 5/02* (2023.01)
*G06N 5/04* (2023.01)

(56) References Cited

U.S. PATENT DOCUMENTS

| | | | |
|---|---|---|---|
| 8,918,431 | B2 | 12/2014 | Mark et al. |
| 9,552,339 | B1 | 1/2017 | Kessenger et al. |
| 9,788,349 | B2 | 10/2017 | Levien et al. |
| 9,946,739 | B2 | 4/2018 | Haddock |
| 10,078,651 | B2 | 9/2018 | Kelly et al. |
| 2005/0010605 | A1* | 1/2005 | Conrad ............... G06F 16/2457 |
| 2005/0265607 | A1 | 12/2005 | Chang |
| 2006/0290709 | A1 | 12/2006 | Omi et al. |
| 2008/0147515 | A1 | 6/2008 | Abraham et al. |
| 2010/0100546 | A1 | 4/2010 | Kohler |
| 2011/0264649 | A1 | 10/2011 | Hsiao et al. |
| 2015/0100943 | A1* | 4/2015 | Gabel .................. G06F 40/20 |
| | | | 717/106 |
| 2017/0201562 | A1 | 7/2017 | Moon et al. |
| 2017/0212930 | A1* | 7/2017 | Carter ................ G06F 16/9024 |
| 2018/0102062 | A1* | 4/2018 | Livni ..................... G09B 7/02 |
| 2018/0239959 | A1* | 8/2018 | Bui ....................... G06F 3/0482 |
| 2019/0065589 | A1 | 2/2019 | Wen et al. |
| 2019/0236394 | A1 | 8/2019 | Price et al. |
| 2019/0361795 | A1* | 11/2019 | Cole ................... G06F 11/3636 |
| 2019/0373330 | A1* | 12/2019 | Bloch ................ H04N 21/4532 |
| 2020/0215695 | A1 | 7/2020 | Cristache |
| 2021/0056215 | A1* | 2/2021 | Guha .................... G06F 9/451 |
| 2021/0090694 | A1* | 3/2021 | Colley .................. G16B 40/00 |

OTHER PUBLICATIONS

Jongejan, et al., Automatic Training of Lemmatization Rules That Handle Morphological Changes in pre- , in-and Suffixes Alike, Proceedings of the 47th Annual Meeting of the ACL and the 4th IJCNLP of the AFNLP, 2009, pp. 145-153, (Year: 2009).*

IBM, "List of IBM Patents or Patent Applications Treated As Related," for U.S. Appl. No. 16/666,747, filed Oct. 29, 2019, 2 pages.

U.S. Appl. No. 16/666,677 "Alternative Modalities Generation for Digital Content Based on Presentation Context," filed Oct. 29, 2019.

Truong Cong Thang et al., "Effective Adaptation of Multimedia Documents with Modality Conversion", Signal Processing: Image Communication, vol. 20, Issue 5, Jun. 2005.

Groger, Christoph, et al., "The Manufacturing Knowledge Repository," Consolidating Knowledge to Enable Holistic Process Knowledge Management in Manufacturing, Proceedings of the 16th International Conference on Enterprise Information Systems (ICEIS), 2014, 13 pages.

Gong, Dihong, "Towards Building Large-Scale Multimodal Knowledge Bases," pp. 2-35.

Li, Huadong, et al., "Multimodal Question Answering over Structured Data with Ambiguous Entities," Proceedings of the 26th International Conference on World Wide Web Companion, pp. 79-88, International World Wide Web Conferences Steering Committee, 2017.

Qi, Fan, et al., "A Unified Framework for Multimodal Domain Adaptation," 2018 ACM Multimedia Conference on Multimedia Conference, pp. 429-437, ACM, 2018.

Vassev, Emil, et al."Requirements and initial model for knowlang: a language for knowledge representation in autonomic service-component ensembles." Proceedings of The Fourth International C Conference on Computer Science and Software Engineering. 2011.

Dolog, Peter, et al. "Integrating Adaptive Hypermedia Techniques and Open RDF-based Environments." WWW (Alternate Paper Tracks). 2003.

Tran, Thanh, Philipp Cimiano, and Anupriya Ankolekar. "Rules for an Ontology-based Approach to Adaptation." 2006 First International Workshop on Semantic Media Adaptation and Personalization (SMAP'06). IEEE, 2006.

* cited by examiner

MULTIMODAL KNOWLEDGE CONSUMPTION ADAPTATION THROUGH HYBRID KNOWLEDGE REPRESENTATION

BACKGROUND

The present invention relates to computing systems, and more specifically, to processes for enhancing human and computer interaction.

Generally, computing systems must adapt their mechanisms according to personalization aspects about users, platforms, and the environment. This is also true for knowledge-based systems, where different users and devices require specific experiences when consuming their knowledge bases. The knowledge represented in these knowledge bases has to consider the specification of all the desired personalization, which can lead to scalability issues. Current solutions do not address the problem of creating knowledge adaptation mechanisms, considering the relationship of knowledge concepts, adaptation strategies, and multimodal content. As a workaround, current solutions focus on implementing software platforms to adapt content based on user interaction with the system, as well as the adaptation of content presentation.

SUMMARY

According to one embodiment of the present invention, a method of generating and using a multimodal knowledge representation within an artificial intelligence computing system, the method comprising prompting a selection of nodes in a graphical visualization to define adaptation strategies for the selected nodes; integrating an adaptation strategy representation with the selection of nodes to generate a multimodal knowledge representation; traversing the selection of nodes in response to a user query; performing an adaptation on the selection of nodes; and updating the knowledge representation based on user feedback to a result generated in response to the user query.

According to another particular embodiment, an apparatus may include a knowledge dashboard to prompt a selection of nodes in a graphical visualization to define adaptation strategies; an adaptation injection module to integrate an adaptation strategy representation with the selection of nodes to generate a multimodal knowledge representation; a query engine to traverse the selection of nodes in response to a user query; and an adaptation agent to perform an adaptation on the selection of nodes, wherein the knowledge dashboard updates the knowledge representation based on user feedback to a result generated in response to the user query.

According to another particular embodiment, a computer program product for generating and using a multimodal knowledge representation within an artificial intelligence computing system may include a computer-readable storage medium having computer-readable program code embodied therewith, the computer-readable program code executable by one or more computer processors to: prompt a selection of nodes in a graphical visualization to define adaptation strategies; integrate an adaptation strategy representation with the selection of nodes to generate a multimodal knowledge representation; traverse the selection of nodes in response to a user query; perform an adaptation on the selection of nodes; and update the knowledge representation based on user feedback to a result generated in response to the user query.

DETAILED DESCRIPTION

Figure 1:
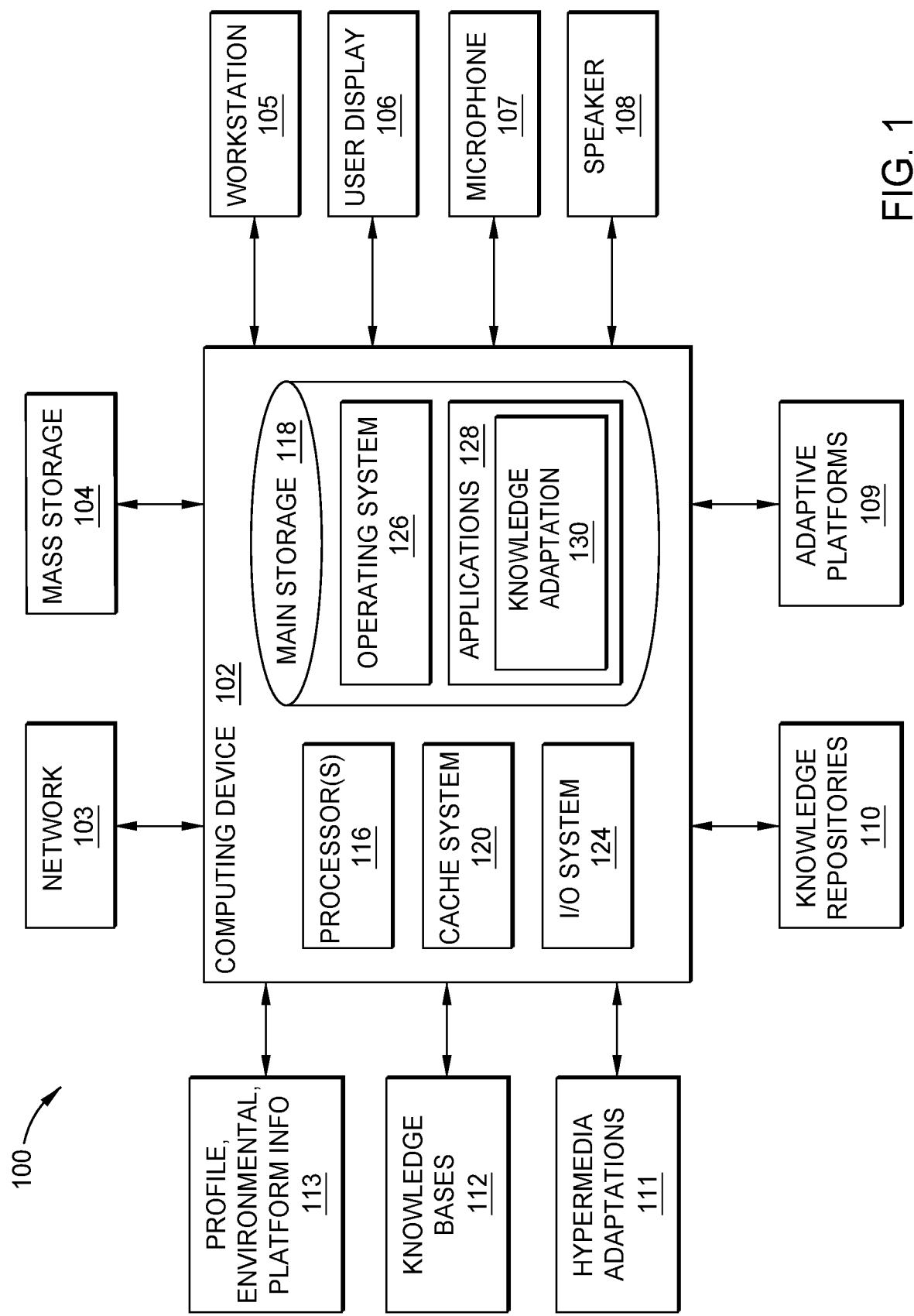
FIG. 1 is a block diagram of a system configured to understand adaption strategies embedded in knowledge representations, and in response, to tailor knowledge representation.

An embodiment of artificial intelligence system may understand adaptation strategies embedded in knowledge representations, and in response, tailor a new knowledge representation. For example, a particular embodiment of the system performs knowledge adaptation as a transformation of multimodal knowledge graphs to address multimodal knowledge consuming personalization and scalability issues. To achieve the knowledge adaptation, the system may use a hybrid knowledge representation configured to facilitate a seamless specification of multimodal content, user interaction, and adaptation strategies. To specify an adaptation strategy, the proposed knowledge representation provides expressiveness to state contexts and the conditions under which the adaptation process may occur. In this manner, knowledge bases that support the representation are able to retrieve knowledge concepts and associated data that are appropriate to the context in which they are being consumed.

Rather than traversing all the nodes in the graph during knowledge consumption (e.g., regardless of whether the nodes are related or not to a specific query), an embodiment of the system may include a specification of adaptation strategies that is embedded in the knowledge representation per se. This embedded feature may allow knowledge graph traversals to be performed according to these strategies. That is, nodes that are unrelated to a query may be abstracted by adaptation entities according to user preferences, context, timing, etc. Instead of promoting adaptation on a user interfaces, an embodiment of the system may specify adaptation strategies in the knowledge graph.

An embodiment of the system may include artificial intelligence mechanisms capable of understanding adaptation strategies embedded in the knowledge representations. Unlike conventional knowledge bases that do not consider personalization aspects, an embodiment of the system may include scalability features, as well as learning techniques regarding appropriate consumption strategies.

An associated method may include knowledge consumption adaptation that considers a specification of adaptation strategies embedded in a knowledge representation. A second basis may include a knowledge graph transversal according to an adaptation strategy. Still another aspect may automatically learn and update the adaptation strategy according to user feedback. To this end, an embodiment of the system may include hypermedia adaptations (e.g., hypertext markup language (HTML), cascading style sheets (CSS) and JavaScript), knowledge repositories (e.g., graph database management systems), as well as adaptive platforms, such as messaging and streaming services.

According to one scenario, a system may execute processes to reflect differences in terms and meaning based on a background of a user. In the example, a geologist and a geophysicist may query a knowledge base about a geological era. The system may understand and give weight to the different backgrounds of the different users. Accordingly, the system may traverse a knowledge graph according to different represented adaptation strategies. A knowledge dashboard of an embodiment may allow the system to answer the query appropriately for each user. The system may additionally accept user feedback. In the example, the geologist may be interested in Kaninops Invisius age, while the geophysicist may be interested in Early Devonian.

According to another scenario, the level and type of detail provided by an embodiment of the system may be affected by an accessed user profile. For example, both a geologist and a reservoir engineer make query a knowledge base about seismic data. An embodiment of the system may access a memory to retrieve a profile for each user. The system may understand the background of each user and traverse the knowledge graph according to represented adaptation strategies. The knowledge dashboard may display answers to the query according to each background of the users. The knowledge dashboard may additionally allow for user feedback. In this instance, a reservoir body may be considered in the result for the reservoir engineer. An interpolated shape may be considered in the result for the geologist.

Other scenarios that include an adaptation of knowledge consumption may occur when users are located in different places. For instance, one user may be located in an offshore platform while another user is located at an onshore office.

Different adaptations of knowledge consumption may occur in other scenarios where users are participating at different moments in the exploration chain. Advantages of the processes of an embodiment of the system may relate to how different entities are treated with different sets of concepts and relationships. Another advantage may include the use of different levels of details. An embodiment of the system may refrain from retrieving results that will not be used. The system may additionally use meaning reasoning to solve issues, such as those associated with different taxonomies.

A presentation adaptation strategy may be used for hypermedia applications, such as HTML. An adaptation involving replicating knowledge representation may be used for knowledge repositories, such as graph database management systems. Adaptive platforms, such as messaging and streaming services, may be addressed using replication of knowledge and coded on adaptation layers.

And embodiment of the system may be directed towards handling knowledge adaptation as a transformation of multimodal knowledge graphs to address consumption personalization at scale. In one example, the system may use a hybrid knowledge representation capable of promoting a seamless specification of multimodal content and adaptation strategies. The system may provide expressiveness to specify adaptation strategies considering the moment and conditions under which the adaptation process may occur. Different knowledge bases may support the proposed representation to retrieve appropriate concepts to the user, as well as the context in which the knowledge is being consumed.

An embodiment of the system may provide support for the specification of adaptation strategies embedded in the nodes that compose a knowledge representation. This support contrasts conventional systems that include no adaptation strategy, where knowledge representation relies on adaptive software systems to duplicate representations for each adaptation condition. The system may provide a context aware knowledge representation, rather than a system that is unaware of adaptation strategies. An embodiment of the system may perform adaptation on multimodal nodes and relationships specified in the knowledge base, as opposed to conventional systems where representation is not multimodal and unaware of adaptation strategies. Conventional systems must traverse multiple copies of nodes, whereas an embodiment of the system may reduce a number of hops when traversing the nodes by structuring the nodes and adaptation strategies into hierarchies. Rather than manually specifying and external strategy, an embodiment of the system may automatically learn and update the adaptation strategies according to user feedback.

An embodiment of the system includes a knowledge-based module that adapts resources according to personalization aspects about different users, platforms and environments. Different users and devices may use specific customizations when accessing nodes from knowledge bases. Knowledge represented in knowledge bases may be considered the specification of desired personalization. This aspect may lead to scalability, e.g., replicating notes for each adaptation condition. The system may focus on implementing software platforms to adapt content based on user interaction with the system, as well as the adaptation of content presentation. An embodiment of the system may create adaptation strategies in the knowledge representation, considering the relationship among nodes, user profiles, environment, and multimodal contact.

An embodiment of the system may provide adaptation mechanisms based on user profiling. Another or the same embodiment of a system may use adaptive technologies for ontologies and terminologies based on user models.

An embodiment of the system may perform multimodal knowledge graph adaptation through hybrid knowledge representation. The system may support the specification of adaptation strategies embedded and nodes that compose the knowledge representation. The system may provide a context-aware knowledge representation. An embodiment of the system may perform adaptation on multimodal notes and relationships specified in the knowledge base. Processes associated with system may reduce a number of hops when traversing nodes in the knowledge representation. The system they automatically learn and update the adaptation strategies according to user feedback.

FIG. 1 is a block diagram of an embodiment of a networked system 100 configured to perform understand adaption strategies embedded in knowledge representations, and in response, to tailor knowledge representation. The system 100 may include a computing device 102 in communication with other modules 103-113. For instance, the computing device 102 may be in communication with a communications network 103, such as the Internet or an intranet, a mass storage device 104, a workstation or other computing device 105, and a user display 106. The user display may include a knowledge platform, as explained herein. Other illustrative connected devices may include a microphone 107, an audio producing device 108 (e.g., a speaker), adaptive platforms 109 (e.g., electronic mail and streaming services), knowledge repositories 110 (e.g., graph database management systems), hypermedia adaptations 111

(e.g., HTML, CSS, and JavaScript), knowledge bases 112, as well as storage including user profile, environmental, and platform information 113.

The computing device 102 generically represents, for example, any of a number of multi-user computers such as a network server, a midrange computer, a mainframe computer, etc. However, it should be appreciated that other embodiments of the system may be implemented in other computers and data processing systems. For example, other embodiments of a system may include single-user computers such as workstations, desktop computers, portable computers, and the like, or in other programmable electronic devices (e.g., incorporating embedded controllers and the like), such as set top boxes, game machines, etc.

The computing device 102 generally includes one or more system processors 116 coupled to a main storage 118 through one or more levels of cache memory disposed within a cache system 120. Furthermore, a main storage 122 may be coupled to a number of the external devices 103-113 via a system input/output (I/O) system 124. Any number of alternate computer architectures may be used in the alternative.

Also shown resident in main storage 118 is a typical software configuration for a computer, including an operating system 126 (which may include various components such as kernels, device drivers, runtime libraries, etc.) accessible by one or more applications 128. Implementations may be realized with or without dedicated hardware components and/or modifications to conventional hardware components, and in particular, purely via software executing on a conventional hardware platform.

In addition, various program code described hereinafter may be identified based upon the application within which it is implemented in a specific embodiment of an implementation. However, it should be appreciated that any particular program nomenclature that follows is used merely for convenience, and thus the implementations should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments are not limited to the specific organization and allocation of program functionality described herein.

Those skilled in the art will recognize that the illustrative environment illustrated in FIG. 1 is not intended to limit the scope of other implementations. Indeed, those skilled in the art will recognize that other alternative hardware and/or software environments may be used in a manner consistent with other implementations of embodiments.

Figure 2:
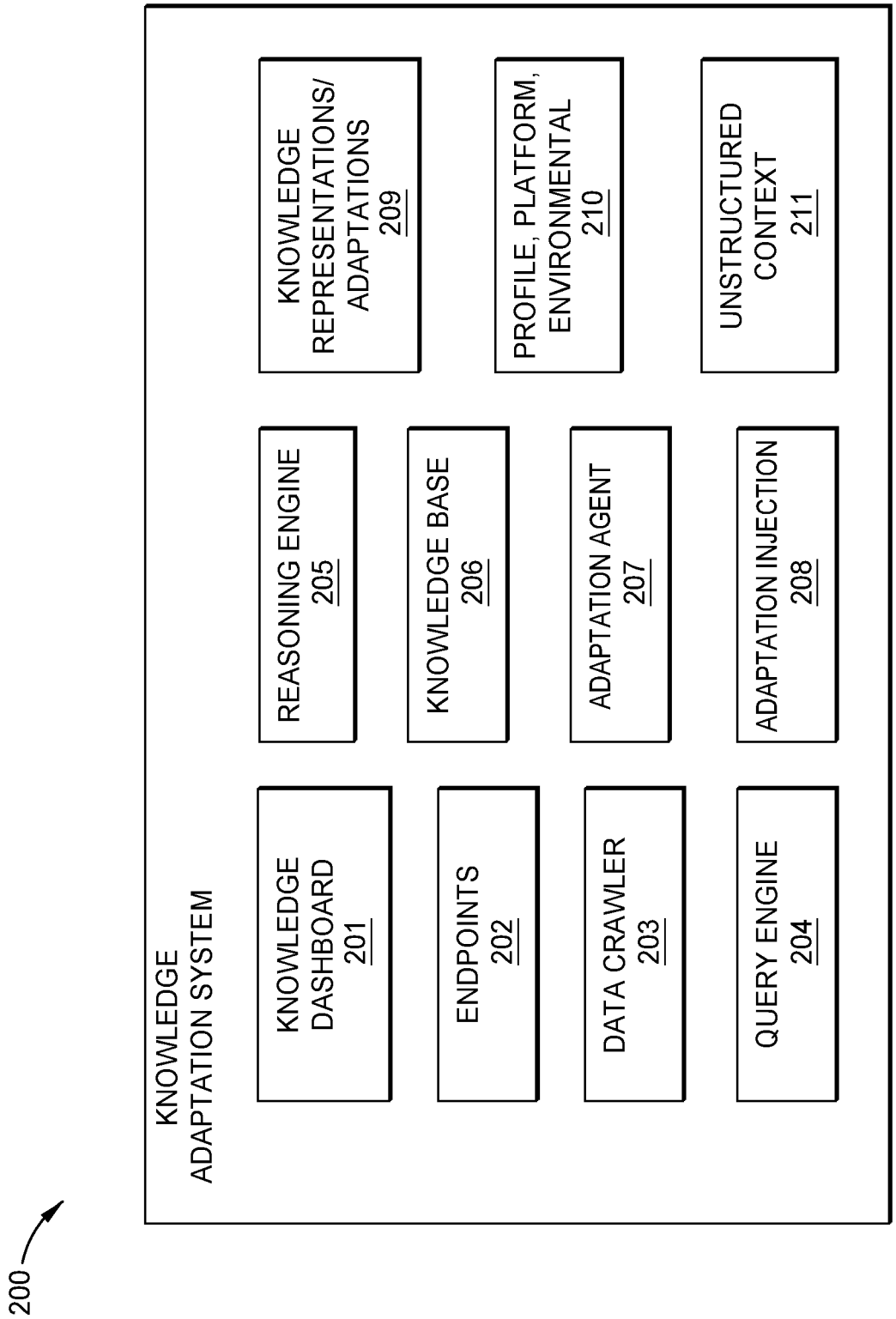
FIG. 2 is a block diagram showing a module of the system of FIG. 1 in more detail according to an embodiment.

FIG. 2 is a block diagram of an embodiment of an illustrative architecture 200 configured to perform multimodal knowledge consumption adaptation through hybrid knowledge representation. The architecture 200 may be similar to the knowledge adaptation module 130 shown in the system 100 of FIG. 1. Turning more particularly to FIG. 2, the system 200 may include a knowledge dashboard module 201, knowledge base endpoints 202, and a knowledge base 216. The system 200 may also include a data crawler module 203, and a query engine module 204. A reasoning engine 205 may comprise a portion of memory of the system 200.

The knowledge dashboard module 201 may present a visual form and a graph visualization. A user may select a set of nodes in the graph visualization. The knowledge dashboard 201 of FIG. 2 may update the user profile and knowledge representation 209 through the endpoints 202 of the system 200. A knowledge representation 209 may generally represent information about the world in a form that a computer system may utilize to solve tasks. A user may access the system endpoints 202 of FIG. 2 to query the knowledge base 216. A knowledge base generally refers to a technology used to store complex structured and unstructured information used by a computer system.

The data crawler module 203 of FIG. 2 may gather information about a user profile consumption platform, environment, and other context related variables 210. The adaptation injection module 208 of the system 200 of FIG. 2 may parse the form and integrate the strategy representation into the previously selected set of nodes in the knowledge representation module 209.

The adaptation agent module 207 of FIG. 2 may traverse the multimodal knowledge representation module 209 to check if there are any adaptations to be performed beforehand and to register the result. The query engine module 204 of FIG. 2 may traverse the nodes related to a query of a user. The adaptation module 207 of FIG. 2 may be used to perform remaining adaptations in the nodes. The reasoning engine 205 of FIG. 2 may be used to apply reasoning and calculation prior to returning the results to the user.

The system 200 may additionally include a user profile, platform and environmental module 206. Unstructured content storage 210 may be included in the knowledge base 216, along with a knowledge representation with adaptation strategies module 209. The system 200 may additionally include an adaptation agent 207 and an adaptation injection module 208. Within the system 200, the knowledge dashboard module 201, the adaptation agent module 207, the adaptation injection module 208, and the knowledge representation with adaptation strategies module 209 may have particular application with adaptation strategy creation processes.

Figure 3:
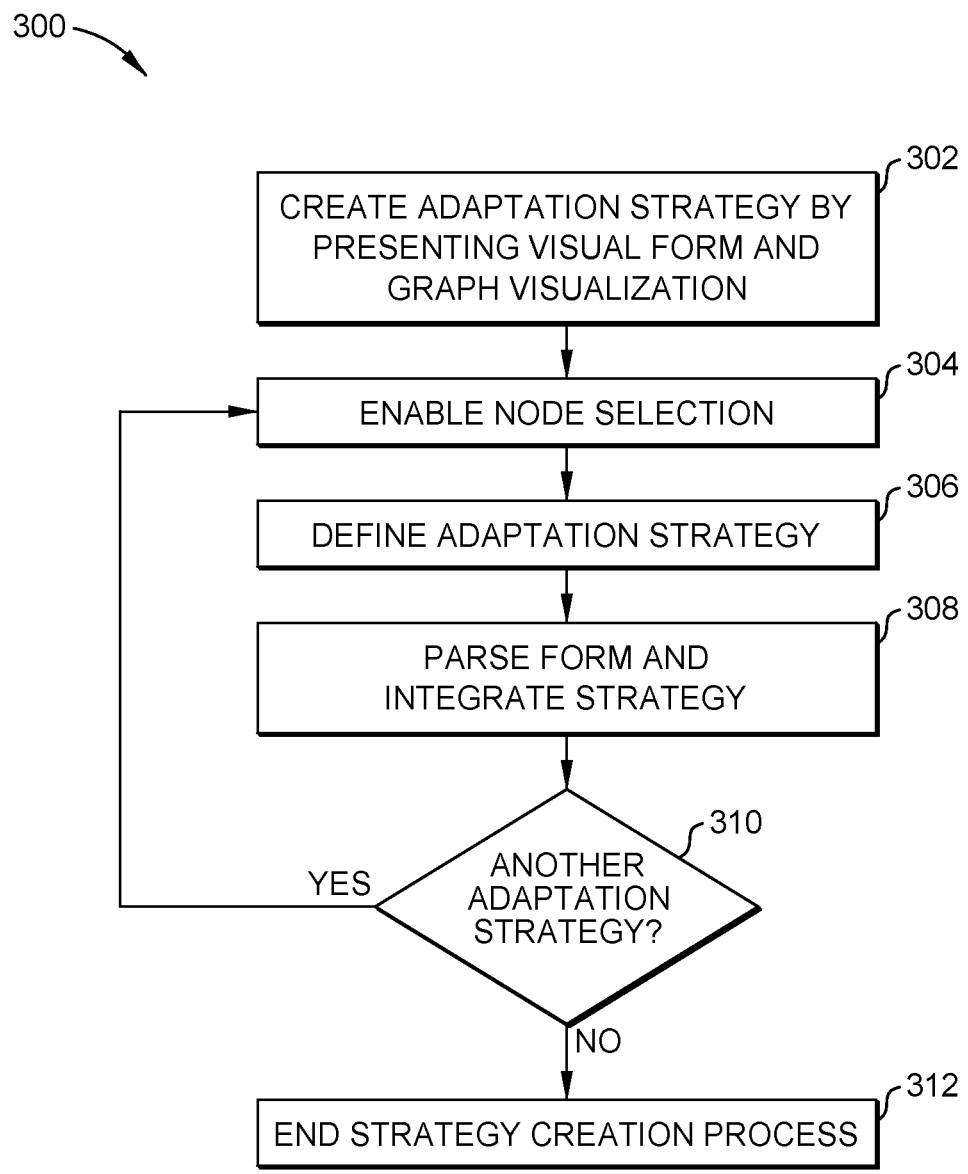
FIG. 3 is a flowchart of an embodiment of a method of creating an adaptation strategy.

FIG. 3 is a flowchart of an embodiment of a method 300 of performing adaptation strategy creation processes. The illustrative method 300 may be performed by the systems 100, 200 of FIGS. 1 and 2. Turning more particularly to the flowchart, a visual form and a graph visualization may be presented to create an adaptation strategy at 302. For example, the knowledge dashboard module 201 of FIG. 2 may present a visual form and a graph visualization.

At 304, a user may select a set of nodes in the graph visualization using the knowledge dashboard. A node may represent any type of information, such as a concept, a content, and a software artifact, among others. The user may select the node using the knowledge dashboard 201 of the system 200 of FIG. 2, for example.

The user may define at 306 an adaptation strategy in the form of the knowledge dashboard by specifying a moment that the adaptation may occur, the rules of how it should be performed, as well as related conditions. The related conditions may include profile parameters, platform characteristics, and environmental details, in addition to reasoning or calculation results.

The form may be parsed at 308. Additionally, a strategy representation may be integrated into the previously selected set of nodes in the knowledge representation. For example, the adaptation injection module 208 of the system 200 of FIG. 2 may parse the form and integrate the strategy representation into the previously selected set of nodes in the knowledge representation module 209.

At 310, the method 300 may determine whether the user wishes to specify another adaptation strategy. Where the user desires to specify another adaptation strategy at 310, the user may be prompted at 304 to select set of nodes in the graph visualization of the knowledge dashboard module, such as the knowledge dashboard module 201 FIG. 2.

Figure 4:
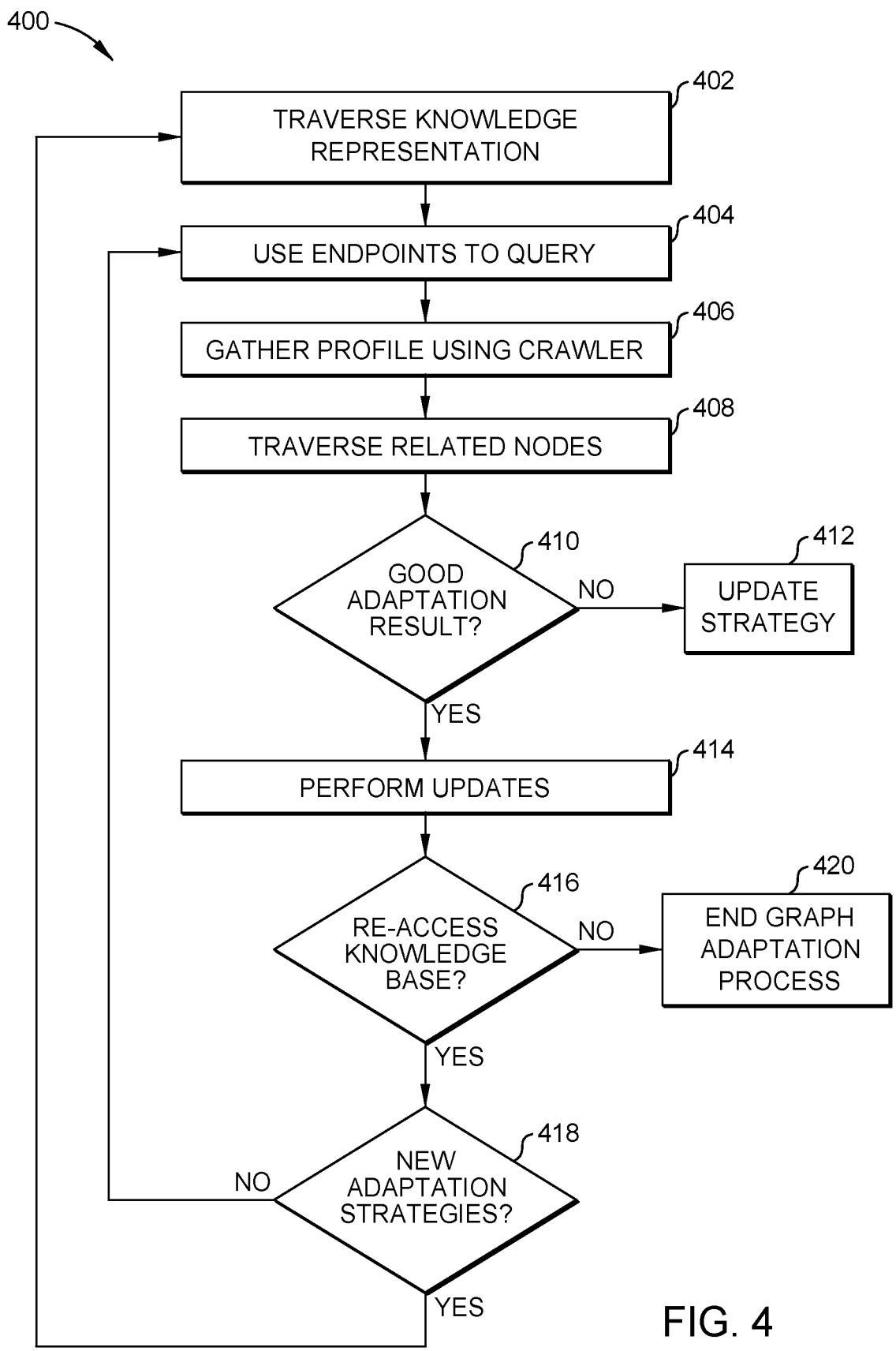
FIG. 4 is a flowchart of an embodiment of a method of creating a knowledge consumption adaptation.

FIG. 4 is a flowchart of an embodiment of a method 400 of performing multimodal knowledge graph adaptation processes. Embodiments of the method 400 may be performed by the systems 100, 200 of FIGS. 1 and 2, for example. Turning more particularly to the method 400 of the flowchart, a multimodal knowledge representation may be traversed at 402 to determine if there are any adaptations to be performed before the process initiates. The result of the traversal may additionally be registered at 402. For example, the adaptation agent module 207 of FIG. 2 may traverse the multimodal knowledge representation module 209 to check if there are any adaptations to be performed beforehand and to register the result.

At 404, endpoints may be accessed to query the knowledge base. For instance, the user may access the system endpoints 202 of FIG. 2 to query the knowledge base 216.

Information may be gathered at 406 about a user profile consumption platform, environment, and other context related variables. For instance, the data crawler module 203 of FIG. 2 may gather information about a user profile consumption platform, environment, and other context related variables 210.

At 408, the nodes related to a user query may be traversed. For example, the query engine module 204 of FIG. 2 may traverse the nodes related to a query of a user. The adaptation module 207 of FIG. 2 may be used to perform remaining adaptations in the nodes. The reasoning engine 205 of FIG. 2 may be used to apply reasoning and calculation prior to returning the results to the user.

The method 400 may determine at 410 if the user is satisfied with the adaptation result. Should the user be dissatisfied with the adaptation result at 410, then information may be gathered at 412 from the user to update adaptation strategies. For instance, the knowledge dashboard 201 of FIG. 2 may gather information from the user to update the adaptation strategies.

Updates at 414 may be provided to the user profile and knowledge representation through the system endpoints. For example, the knowledge dashboard 201 of FIG. 2 may update the user profile and knowledge representation 209 through the endpoints 202 of the system 200.

An embodiment of the method 400 may determine at 416 if a user wants to access the knowledge base, again. Where the user does want to re-access the knowledge base, the system may determine at 418 if there are any new adaptation strategies in the knowledge base.

Where the system determines at 418 that there are new adaptation strategies in the knowledge base, the adaptation agent may be used to traverse the multimodal knowledge representation at 402. Alternatively, where there are no new adaptation strategies in the knowledge base at 418, the user may access the system endpoints to query the knowledge base at 404.

Figure 5:
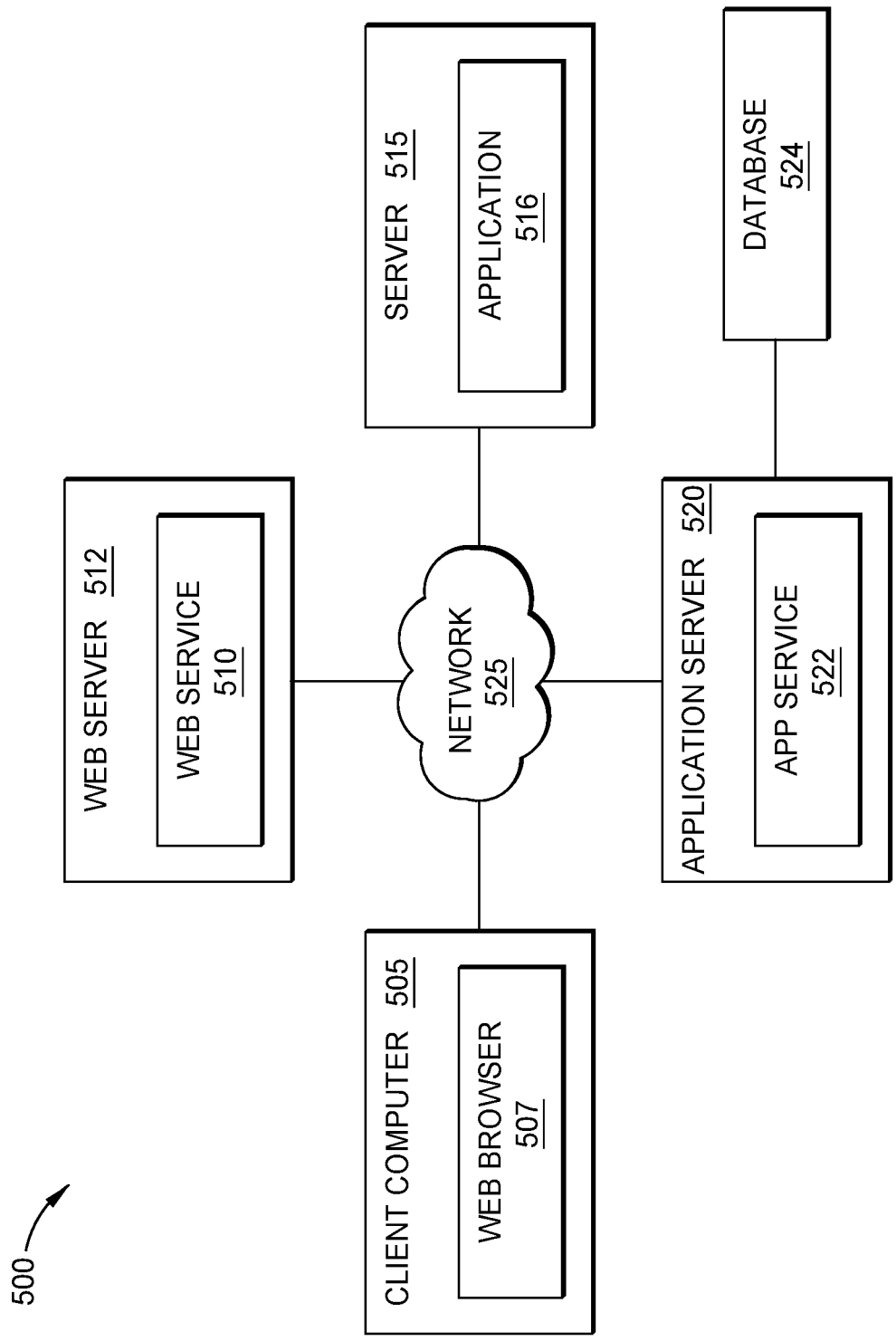
FIG. 5 illustrates another example computing system according to one embodiment, such as may be realized using a networked environment.

FIG. 5 illustrates another example computing system according to one embodiment, such as may be realized using a networked environment. As shown, the computing environment 500 includes a client computer 505, a web server 510, a server 515, an application 516, and an application server 520. The client computer 505 may be a physical system (e.g., a desktop, laptop computer, mobile device, etc.) or a virtual computing instance executing in the cloud. The client computer 505 includes a web browser 507. A user may access data services through the web browser 507 over a network 525 (e.g., the Internet).

For instance, a user may access a web service 512 executing on a web server 510. In one embodiment, the web service 512 provides a web interface for an application server 520 (e.g., executing an application service 522). More specifically, the application service 522 provides a database 524. The database 524 may include data presented to users on the web browser 507.

Figure 6:
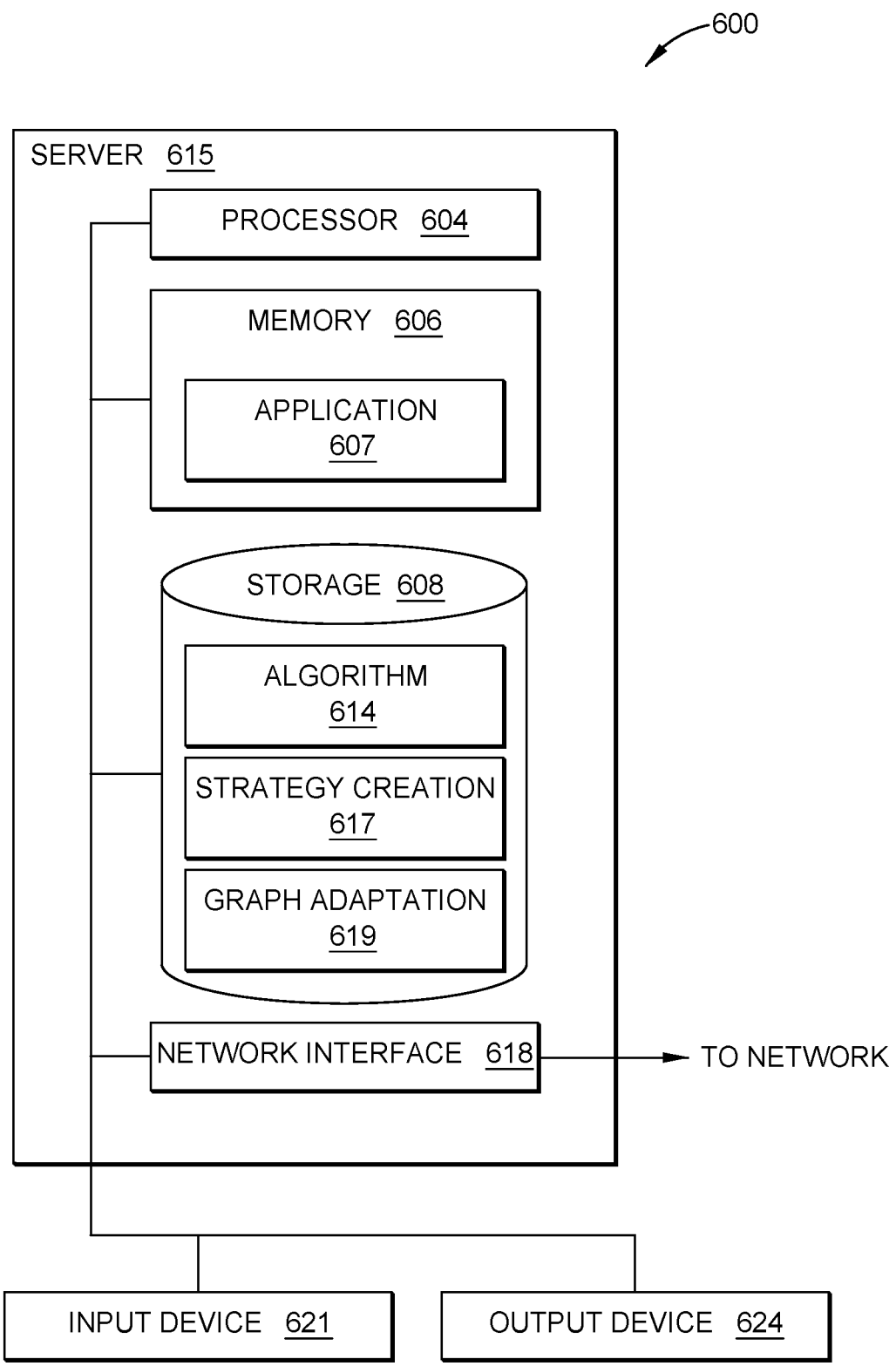
FIG. 6 further illustrates a server, such as the server of FIG. 5, according to one embodiment.

FIG. 6 further illustrates a server 615, such as the server 515 of FIG. 5, according to one embodiment. The server 615 generally includes a processor 604 connected via a bus to a memory 606, a network interface device 618, a storage 608, an input device 621, and an output device 624. The server 615 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 610 to communicate with other computers via the network 625.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems.

As shown, the memory 606 contains the application 617, which may be an application generally executed to take actions described herein. Storage 608 contains the algorithms 614, modality data, adaptation strategy creation code 617, and multimodal knowledge graph adaptation code 619.

The input device 621 may provide a keyboard and/or a mouse, etc. The output device 624 may be any conventional display screen. Although shown separately from the input device 621, the output device 624 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., threshold adjustment algorithms) or related data available in the cloud. For example, the modules of FIG. 1 could execute on a computing system in the cloud and. In such a case, the threshold adjustment algorithms could adjust response thresholds and store the new values at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof. While certain embodiments are applicable to spoken language systems, the claims are not limited or even particularly applicable to spoken language interfaces. In one example, an embodiment of a method may not relate to speech modality. The scope thereof is thus determined by the claims that follow.

What is claimed is:

1. A method of generating and using a multimodal knowledge representation within an artificial intelligence computing system, the method comprising:

prompting, via one or more processors, a selection of nodes in a graphical visualization;

defining an adaptation strategy comprising a user profile component stored in a memory coupled to the one or more processors;

integrating, via the one or more processors, an adaptation strategy representation with the selection of nodes to generate a multimodal knowledge representation;

traversing the selection of nodes in response to a user query to register a traversal result;

performing an adaptation on the selection of nodes based on the traversal result;

displaying, via a display device, a result generated in response to the user query;

receiving user feedback on the result generated in response to the user query, the user feedback indicating a user profession, wherein a meaning applied to one or more terms by the user profession is different than an alternative meaning applied to the one or more terms by a different profession; and in response to the user feedback, updating, via the one or more processors, the adaptation strategy to reflect the meaning applied to the one or more terms by the user profession;

performing an updated adaption on at least one selection of nodes based on the updated adaptation strategy, wherein the updated adaptation causes at least one node unrelated to the meaning applied to the one or more terms by the user profession to be removed from the multimodal knowledge representation, and the at least one node that is removed from the multimodal knowledge representation is related to the alternative meaning applied to the one or more terms by the different profession.

2. The method of claim 1, further comprising applying reasoning and calculation to the selection of nodes.

3. The method of claim 1, further comprising presenting the graphical visualization and a graphical visualization to a user.

4. The method of claim 1, further comprising receiving an adaptation strategy from user input.

5. The method of claim 1, further comprising outputting the result to a user.

6. The method of claim 1, wherein updating the knowledge representation includes using knowledge endpoints.

7. The method of claim 1, wherein a node of the selection of nodes represents at least one of: a concept, a content, and a software artifact.

8. The method of claim 1, defining the adaptation strategy by specifying at least one of: a moment an adaptation may occur, a rule of the adaptation should be performed, a user profile parameter, a platform characteristic, an environmental detail, and a reasoning and calculation result.

9. The method of claim 1, further comprising parsing a visual form.

10. An apparatus comprising:

a knowledge dashboard to prompt, via one or more processors, a selection of nodes in a graphical visualization;

an adaptation strategy definition interface adapted to receive an adaptation definition, wherein the adaptation definition comprises a user profile component stored in a memory coupled to the one or more processors;

an adaptation injection module to integrate, via the one or more processors, an adaptation strategy representation with the selection of nodes to generate a multimodal knowledge representation;

a query engine to traverse the selection of nodes in response to a user query to register a traversal result;

an adaptation agent to perform an adaptation on the selection of nodes based on the traversal result, wherein a display device displays a result generated in response to the user query;

the adaptation strategy definition interface further adapted to receive user feedback on the result generated in response to the user query, the user feedback indicating a user profession, wherein a meaning applied to one or more terms by the user profession is different than an alternative meaning applied to the one or more terms by a different profession; and the adaptation injection module further adapted to, in response to the user feedback, update, via the one or more processors, the adaptation strategy to reflect the meaning applied to the one or more terms by the user profession;

the adaptation agent further adapted to perform an updated adaption on at least one selection of nodes based on the updated adaptation strategy, wherein the updated adaptation causes at least one node unrelated to the meaning applied to the one or more terms by the user profession to be removed from the multimodal knowledge representation, and the at least one node that is removed from the multimodal knowledge representation is related to the alternative meaning applied to the one or more terms by the different profession.

11. The apparatus of claim 10, further comprising further comprising a reasoning module to apply reasoning and calculation to the selection of nodes.

12. The apparatus of claim 10, wherein the knowledge dashboard presents the graphical visualization and a graphical visualization to a user.

13. The apparatus of claim 10, wherein the knowledge dashboard receives an adaptation strategy from user input.

14. The apparatus of claim 10, wherein the knowledge dashboard outputs the result to a user.

15. The apparatus of claim 10, wherein updating the knowledge representation includes using knowledge endpoints.

16. The apparatus of claim 10, wherein a node of the selection of nodes represents at least one of: a concept, a content, and a software artifact.

17. The apparatus of claim 10, wherein the adaptation strategy is defined by at least one of: a moment an adaptation may occur, a rule of the adaptation should be performed, a user profile parameter, a platform characteristic, an environmental detail, and a reasoning and calculation result.

18. A non-transitory computer-readable storage medium for generating and using a multimodal knowledge representation within an artificial intelligence computing system, the non-transitory computer-readable storage medium having computer-readable program code embodied therewith, the computer-readable program code executable by one or more computer processors to:

prompt, via the one or more computer processors, a selection of nodes in a graphical visualization;

define an adaptation strategy comprising a user profile component stored in a memory coupled to the one or more computer processors;

integrate, via the one or more computer processors, an adaptation strategy representation with the selection of nodes to generate a multimodal knowledge representation;

traverse the selection of nodes in response to a user query to register a traversal result;

perform an adaptation on the selection of nodes based on the traversal result;

cause display, via a display device, of a result generated in response to the user query;

receive user feedback on the result generated in response to the user query, the user feedback indicating a user profession, wherein a meaning applied to one or more terms by the user profession is different than an alternative meaning applied to the one or more terms by a different profession; and in response to the user feedback, update, via the one or more computer processors, the adaptation strategy to reflect the meaning applied to the one or more terms by the user profession;

perform an updated adaption on at least one selection of nodes based on the updated adaptation strategy, wherein the updated adaptation causes at least one node unrelated to the meaning applied to the one or more terms by the user profession to be removed from the multimodal knowledge representation, and the at least one node that is removed from the multimodal knowledge representation is related to the alternative meaning applied to the one or more terms by the different profession.

19. The computer program product of claim 18, wherein the adaptation strategy is defined by at least one of: a moment an adaptation may occur, a rule of the adaptation should be performed, a user profile parameter, a platform characteristic, an environmental detail, and a reasoning and calculation result.

20. The computer program product of claim 18, wherein the computer-readable program code is executable by the one or more computer processors to output the result to a user.

* * * * *